United States Patent [19]
Sapru et al.

[11] Patent Number: 5,697,221
[45] Date of Patent: Dec. 16, 1997

[54] ROBUST METAL HYDRIDE HYDROGEN STORAGE SYSTEM

[75] Inventors: Krishna Sapru, Troy; Srinivasan Venkatesan, Southfield; Ned T. Stetson, Auburn Hills, all of Mich.; Krishnaswamy Rangaswamy, Clarendon Hills, Ill.

[73] Assignee: Energy Conversion Devices, Inc., Troy, Mich.

[21] Appl. No.: 569,487

[22] Filed: Dec. 8, 1995

[51] Int. Cl.⁶ .................................................. F17C 11/00
[52] U.S. Cl. .............................. 62/46.2; 62/46.3; 62/45.1
[58] Field of Search ........................... 62/46.2, 45.1, 62/46.3; 220/4.26, 23.4, 23.6; 206/503, 821

[56] References Cited

U.S. PATENT DOCUMENTS

| | | | |
|---|---|---|---|
| 1,835,887 | 12/1931 | Mackey | 62/46.3 |
| 3,732,690 | 5/1973 | Meijer | 60/39.46 |
| 4,489,564 | 12/1984 | Hausler et al. | 62/46.2 |
| 4,736,779 | 4/1988 | Bernauer | 141/4 |
| 4,978,023 | 12/1990 | Behlmann et al. | 220/23.6 |

*Primary Examiner*—Henry A. Bennett
*Assistant Examiner*—Pamela A. O'Connor

[57] ABSTRACT

A modular metal hydride hydrogen storage system which can provide a robust and reliable source of hydrogen that can quickly and easily be modified for a variety of applications and environments. The hydrogen storage system comprises at least one storage module. Each storage module comprises a container for storing metal hydride and gaseous hydrogen, and an adapter for connecting storage modules together end-to-end to form a connected sequence of storage modules.

8 Claims, 2 Drawing Sheets

ROBUST METAL HYDRIDE HYDROGEN STORAGE SYSTEM

FIELD OF THE INVENTION

The present invention is concerned with a hydrogen storage system. More particularly, the present invention is concerned with a metal hydride hydrogen storage system.

BACKGROUND

Hydrogen is stored conventionally as a gas or a liquid. Hydrogen storage as a gas is typically in large, bulky steel cylinders at very high pressures (e.g. 2,000 psi). Hydrogen storage as a liquid is typically in insulated containers at very low temperatures. Energy must be used to keep the temperature low to prevent the liquid hydrogen from boiling off. Hence, cryogenic hydrogen production and storage is highly inefficient.

Within recent years, considerable attention has been focused on the storage of hydrogen as a metallic compound, or hydride, of various substances. Metal hydrides can store large amounts of hydrogen at low pressures in relatively small volumes. This low pressure storage of hydrogen is relatively safe and allows the construction of hydrogen containers having forms significantly different than those storing gaseous hydrogen. Hydridable metals are charged with hydrogen by introducing pressurized gaseous hydrogen into valved containers. The hydrogen gas reacts exothermically with the metal to form the metal hydride compound. Conversely, the hydrogen is released from the metal hydride by opening the valve of the container to permit decomposition of the compound in an endothermic reaction.

The use of solid hydridable materials to store hydrogen is disclosed in numerous patents, such as U.S. Pat. Nos. 3,508,514, 3,516,263 and 4,036,944, each incorporated herein by reference. These solid hydridable materials are characterized by an interrelation of temperature, pressure and hydrogen content, such that, at any given temperature, the hydrogen content of the hydridable material is determined by the partial pressure of the hydrogen in contact with that material. Generally, as temperature rises it takes a greater partial pressure of hydrogen to maintain a given concentration of hydrogen in the hydridable material. The converse is also true as temperature decreases.

The reversible storage of hydrogen in the form of an intermetallic hydride has several advantages over conventional gaseous and liquid hydrogen storage. The use of metal hydrides offer pronounced volumetric advantages over compressed gas, along with much lower required pressure, a safety advantage. In addition, the use of metal hydrides provides excellent insurance that the hydrogen released from the containers is of very high purity.

Metal hydride storage units have many uses and applications in a variety of industrial and laboratory environments. The diversity of applications requires a storage system that can provide the user with a reliable source of hydrogen at a variety of capacities. Small storage units are commonly used as hydrogen sources for laboratory experimentation. Much larger units are needed to provide the quantity of hydrogen necessary for vehicular transportation systems. Hence, a modular hydrogen storage system is needed that will allow for quick and easy modification of system capacity. The storage system, regardless of the size and capacity of the container, must be robust enough to perform properly and reliably under a wide range of environmental conditions.

The diversity of applications for metal hydride hydrogen storage also necessitates a storage system that will allow for container storage and packaging in many different physical locations. Such "packaging flexibility" is especially important in the transportation industry where component packaging space is often quite scarce.

SUMMARY OF THE INVENTION

One object of the present invention is to provide a modular metal hydride hydrogen storage system which can provide a robust and reliable source of hydrogen that can quickly and easily be modified for a variety of applications and environments.

This object is achieved by a hydrogen storage system comprising at least one storage module where each storage module comprises: a container for metal hydride and gaseous hydrogen having an open end and a closed end, opposite to the open end, where the closed end has a passage port; means for introducing gaseous hydrogen into and withdrawing gaseous hydrogen from the container through the passage port; and means for connecting the closed end of one container to the open end of another container.

The object is further achieved by a hydrogen storage system comprising a connected sequence of storage modules where the closed end of one storage module is connected to the open end of the adjacent storage module.

DETAILED DESCRIPTION OF THE INVENTION

The present invention discloses a uniquely designed metal hydride storage module that can be connected end-to-end with similar storage modules to form a robust, reliable and well-engineered metal hydride hydrogen storage system.

Figure 1:
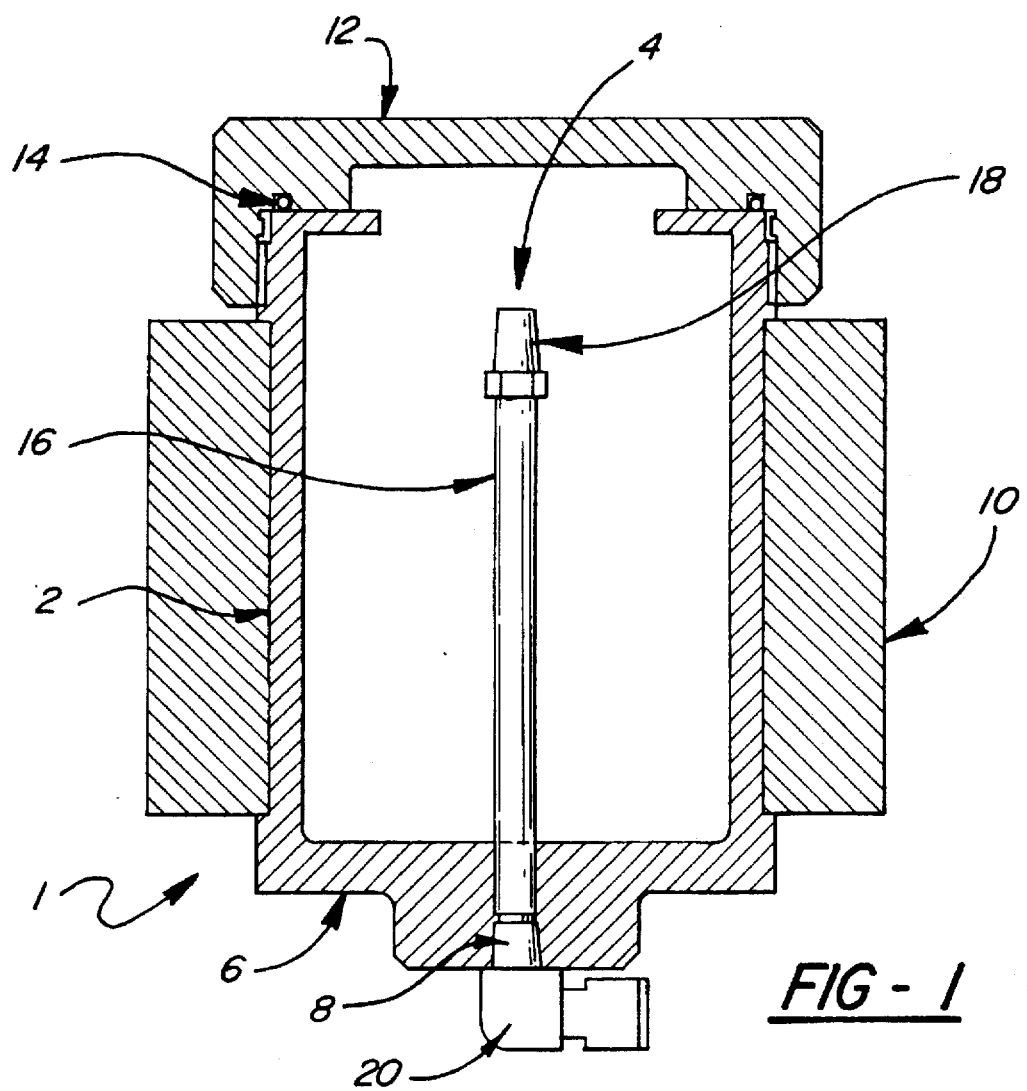
FIG. 1 depicts a single metal hydride hydrogen storage module.

FIG. 1 shows an embodiment of the metal hydride hydrogen storage system of the present invention utilizing a single metal hydride storage module 1. The module comprises a container 2 which may be any shape that can properly store the metal hydride material. FIG. 1 shows an embodiment of a container 2 which is a cylinder having an open end 4 and a closed end 6 opposite the open end 4. The closed end 6 has a passage port 8.

The hydrogen storage module 1 further comprises a heat transfer means which is necessary to transfer heat away from the metal hydride during the hydrogen absorption process (exothermic) and to transfer heat into the metal hydride during the hydrogen desorption process (endothermic). FIG. 1 shows an embodiment of the heat transfer means comprising a plurality of heat fins 10 which are attached to container 2. The plurality of heat fins are preferably spaced equidistantly around the container 2.

The solid metal hydride material may either partially or totally fill the interior of container 2. The metal hydride material used can be formed from a number of metals, alloys and intermetallic compounds which react reversibly with hydrogen at ambient temperature and modest gas pressure. Examples of compounds that may be used to form metal hydrides include, but are not limited to, the alloys from the $AB_5$ (e.g. $LaNi_5$), AB (e.g. TiFe) and $A_2B$ (e.g. $Mg_2Ni$) families. Using these compound, metal hydrides can be formed readily and reversibly (i.e. hydrogenated and dehydrogenated) in the vicinity of ordinary temperatures and at modest hydrogen pressures. That portion of the interior of container 2 not filled with metal hydride material is the gaseous hydrogen region.

The open end 4 of the container 1 may be is sealed using the container cap 12. The interior surface of the container cap 12 as well as the sides of the container 2 adjacent to the open end 4 are threaded so that container cap 12 can easily screw onto the open end 4 of the container. A cap o-ring 14 is sandwiched between the container cap 12 and the rim of the open end 4 to ensure a tight seal so that hydrogen gas does not escape through the open end. While in this embodiment of the present invention the container cap 12 screws onto the container, other means of closing the open end of the container, such as compression fittings, plugs, etc., are also possible. Furthermore, the container cap 12 may be fitted with various types of gauges (i.e. temperature and pressure) depending on the application.

A passage means is used to transport gaseous hydrogen into and out of the container 2. One embodiment of the passage means is a passage tube 16 positioned along the axis of the container. The passage tube 16 is impermeable to metal hydride. The passage tube 16 may be either permeable or impermeable to gaseous hydrogen. In the embodiment of the invention shown in FIG. 1, one opening of the passage tube 16 extends into the passage port 8 located in the closed end 6 of the container. The other opening extends into the hydrogen gas region of the interior of the container 6. This opening is covered with a sintered filter 18. The sintered filter 18 prevents impurities from passing through the passage tube 16. The passage tube 16 allows gaseous hydrogen to be introduced into the container and withdrawn from the container by connecting a valve 20 into the passage port 8.

Figure 2:
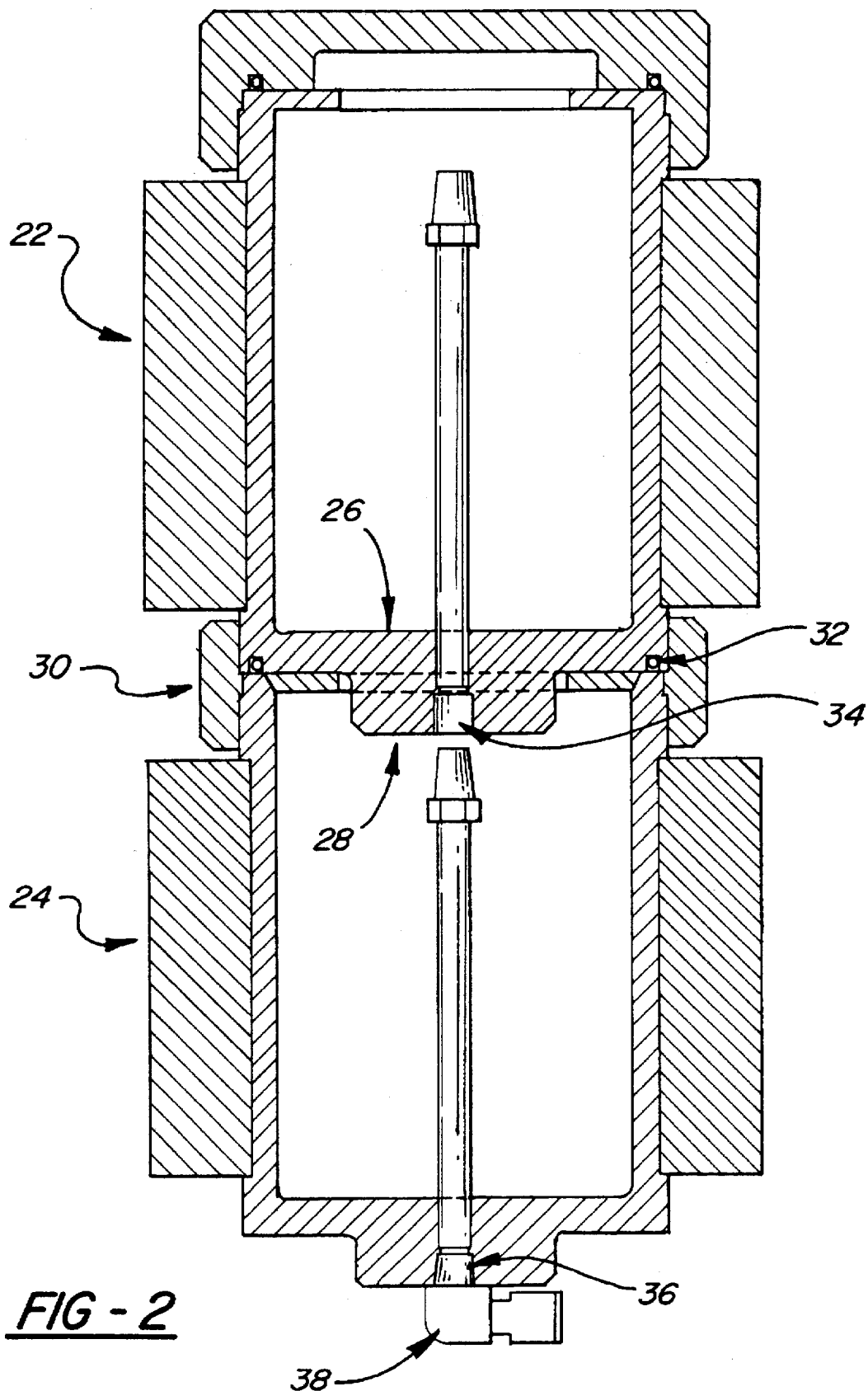
FIG. 2 depicts a connected sequence of two metal hydride hydrogen storage modules connected together by an adapter.

The storage capacity of the metal hydride hydrogen storage system of the present invention can be easily increased by attaching additional storage modules to the storage module 1 shown in FIG. 1. Storage modules are connected end-to-end to form a connected sequence of storage modules. FIG. 2 shows an embodiment of the metal hydride hydrogen storage system of the present invention using two storage modules, a first module 22 and a second module 24.

Figure 3:
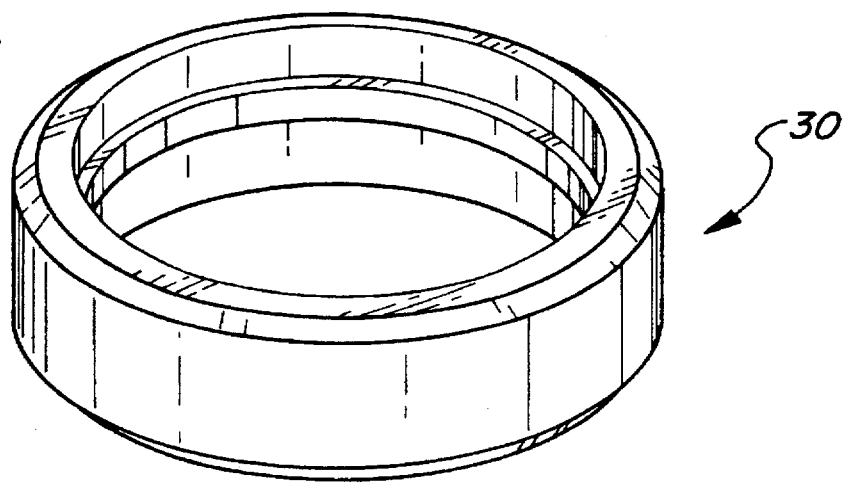
FIG. 3 depicts an adapter, annular in shape, used to connect one metal hydride hydrogen storage unit to another.

The closed end 26 of the first storage module 22 is attached to the open end 28 of the second storage module 24. They are attached using an attachment means for keeping the two storage modules securely and firmly together. An embodiment of the attachment means is the adapter 30 shown in FIG. 2 and FIG. 3. The adapter 30 is preferably an annular ring with a threaded inner surface. To accommodate the adapter 30, the outer surface of each storage module's container is also threaded near both the open and closed ends. The closed end 26 of the first storage module and the open end 28 of the second storage module can thus be screwed into the opposite ends of the adapter 30 and squeezed firmly together. A container o-ring 32 is sandwiched between closed end 26 and the rim of open end 28 to form a tight seal between the first storage module 22 and the second storage module 24. While this embodiment of the attachment means uses the adapter 30 shown in FIGS. 2 and 3, other means of connecting two storage modules are also possible. These include different types of compression fittings and clamping systems. In addition, a "quick disconnect" type of fitting may be used so that modules can easily be replaced. Moreover, the lid and container o-rings used to form the proper seals may be replaced with various types of gaskets.

The passage port 34 of the first storage module 22 extends into the open end 28 of the second storage module. This permits the free flow of hydrogen gas between the first and second storage modules without the need to connect extraneous valves and tubes. Gaseous hydrogen may be introduced into the system or removed from the system by connecting a valve 38 to the passage port 36 of the second storage module.

The hydrogen storage capacity of the storage system described in the present invention may be repeatedly increased by adding additional storage units in the same manner as described above. The storage capacity can thus be increased or decreased quickly and easily without additional devices that can add cost to the system while reducing reliability.

The modularity of the system greatly simplifies the engineering effort necessary to design storage units of different capacities. An understanding of the engineering characteristics of a single storage module provides an understanding of the characteristics of larger capacity storage systems built by connecting several storage modules together. For example, the design of a metal hydride hydrogen storage system requires a good understanding of the heat transfer properties of the system. As mentioned earlier, heat flows out of and into the metal hydride material as hydrogen is absorbed by the metal and released by the metal. Proper operation of the storage system requires that the underlying design includes the proper heat transfer means that can appropriately transfer heat out of and into the metal hydride.

The design of the appropriate heat transfer mechanism depends upon many factors. These include the type and quantity of metal hydride used as well as the shape, volume and material of the container holding the metal hydride. Changing the volume of the container in order to increase hydrogen storage capacity changes the heat transfer characteristics of the storage system and requires a modification of the heat exchange system. This increases the complexity and cost of the design process.

Because the capacity of the hydrogen storage system of the present invention is increased or decreased by adding or removing identical storage modules, the heat transfer characteristics of almost any capacity system can be understood in terms of the heat transfer characteristics of a single storage module. Hence, once a heat exchange system has been appropriately designed for a single module it is not necessary to re-design the system for larger systems. It is thus possible to provide a hydrogen storage system of almost any capacity which is well engineered, highly reliable and of superior quality.

Furthermore, because the hydrogen storage system of the present invention is built by connecting together a plurality of identical storage modules, the physical dimensions of the system may easily be adapted to the packaging space available. Such adaptability can be very important when packaging space is scarce and must be efficiently utilized. This is especially important in such industries as automotive manufacturing where, because of space limitations, component packaging is a major engineering concern, and where improper packaging can cause many assembly and quality problems.

Finally, the metal hydride storage system of the present invention provides a way to increase hydrogen capacity quickly and easily without the need for adding valves and tubing that add cost and quality problems to the system. Valves and tubing can crack and leak from embrittlement, fatigue and external vibration, thus decreasing the reliability of the storage system. This factor is again especially important for applications in automotive manufacturing where the need to package and route extraneous fuel lines can easily be a major source of design, manufacturing and quality problems.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

We claim:

1. A hydrogen storage system for storing hydrogen in a metal hydride, said storage system comprising:

at least a first storage module attached to a second storage module, where each of said identical storage modules comprises:

a container for metal hydride having
an open end including an attachment means, and
a closed end, opposite to said open end, said closed end having a passage port; and a passage tube positioned in said container and surrounded by said metal hydride, said passage tube gaseously connected to said passage port:

wherein said closed end of said first storage module is attached to said open end of said second storage module via said attachment means and said first storage module is in gaseous communication with said second storage module through said passage port; and a container cap covering said open end of said first storage module.

2. The hydrogen storage system of claim 1, wherein said container is a cylinder.

3. The hydrogen storage system of claim 1, wherein said passage tube is impermeable to gaseous hydrogen.

4. The hydrogen storage system of claim 1, wherein said passage tube is permeable to gaseous hydrogen.

5. The hydrogen storage system of claim 1, wherein said attachment means comprises an adapter, annular in shape, having a threaded interior surface, where said threaded interior surface allows said closed end of said first storage module and said open end of said second storage module to be threaded into opposite sides of said adapter.

6. The hydrogen storage system of claim 5, wherein said attachment means further comprises:

a container o-ring compressed between said closed end of said first storage module and said open end of said second storage module.

7. The hydrogen storage system of claim 1, wherein each of said storage modules further comprises a heat exchange means for transferring heat into and out of said storage module.

8. The hydrogen storage system of claim 7, wherein said heat exchange means is a plurality of heat fins connected to the exterior of said container.

* * * * *